(12) United States Patent
Linzbach

(10) Patent No.: US 10,661,612 B2
(45) Date of Patent: May 26, 2020

(54) WHEEL VALVE ARRANGEMENT AND TIRE PRESSURE CONTROL SYSTEM HAVING AT LEAST ONE SUCH WHEEL VALVE ARRANGEMENT

(71) Applicant: PTG Reifendruckregelsysteme GmbH, Neuss (DE)

(72) Inventor: Martin Linzbach, Neuss (DE)

(73) Assignee: PTG REIFENDRUCKREGELSYSTEME GMBH, Neuss (DE)

( * ) Notice: Subject to any disclaimer, the term of this patent is extended or adjusted under 35 U.S.C. 154(b) by 141 days.

(21) Appl. No.: 15/773,493

(22) PCT Filed: Nov. 2, 2016

(86) PCT No.: PCT/EP2016/076327
§ 371 (c)(1),
(2) Date: May 3, 2018

(87) PCT Pub. No.: WO2017/076849
PCT Pub. Date: May 11, 2017

(65) Prior Publication Data
US 2018/0312019 A1 Nov. 1, 2018

(30) Foreign Application Priority Data

Nov. 4, 2015 (DE) ............... 20 2015 105 859 U

(51) Int. Cl.
*B60C 23/00* (2006.01)
(52) U.S. Cl.
CPC .................. *B60C 23/003* (2013.01)
(58) Field of Classification Search
CPC ................................................. B60C 23/003
See application file for complete search history.

(56) References Cited

U.S. PATENT DOCUMENTS

| 1,800,780 A | 4/1931 | Daneel |
| 1,865,231 A | 6/1932 | Buck |
| (Continued) | | |

FOREIGN PATENT DOCUMENTS

| DE | 547256 | 3/1932 |
| DE | 827605 | 1/1952 |
| (Continued) | | |

OTHER PUBLICATIONS

International Search Report dated May 11, 2017 in parent application PCT/EP2016/076327.
(Continued)

*Primary Examiner* — Kip T Kotter
(74) *Attorney, Agent, or Firm* — Polson Intellectual Property Law, PC; Margaret Polson; Christopher Sylvain

(57) ABSTRACT

The present disclosure relates to a wheel valve arrangement (1) for a tire pressure control system of a vehicle, which wheel valve arrangement (1) comprises a pneumatically switchable wheel valve (2) and a shuttle valve (3) operating on the pressure balance principle as a vent valve, the control input (6) of which is to be connected to a tire connection channel (7) leading to a tire interior, and the input (4) of which is to be connected as control input to an air supply line. Said wheel valve arrangement (1) is characterized by the fact that the pneumatically controllable wheel valve (2) is connected into the tire connection channel (7) for closing and opening a fluid path between the shuttle valve (3) and a wheel connection (9) belonging to the wheel valve arrangement (1), which wheel valve (2) has a valve body (17) which can be moved by a piston rod (19) which, by means of a least one spring element (24), acts against the valve seat (13) assigned thereto in the closed position and which can be moved by the piston rod (19) into an open position moved away from the valve seat (13), and has a control piston (22)

(Continued)

guided in a control cylinder (21) and connected to the piston rod (19), which control cylinder (21) is to be connected or is connected by the control chamber (28) of the control cylinder delimited by the drive side of the control piston (22) via the control line (29) to the supply line (5) on the input side of the shuttle valve (3), wherein the control piston (22) is designed in order that the valve body (17) can be moved away from the valve seat (13) of the valve body by means of the target tire filling pressure present in the air supply line (5) in order to open the wheel valve (2). The present disclosure further relates to a tire pressure control system for a vehicle having such a wheel valve arrangement.

18 Claims, 1 Drawing Sheet

(56) References Cited

U.S. PATENT DOCUMENTS

| | | | |
|---|---|---|---|
| 1,969,225 A | 8/1934 | Lear | |
| 2,128,623 A | 7/1937 | Stuck | |
| 2,095,912 A | 10/1937 | Boyd | |
| 2,361,890 A | 10/1944 | Watson | |
| 2,418,730 A | 4/1947 | Schule | |
| 2,854,020 A | 9/1958 | Williams | |
| 3,180,349 A | 4/1965 | Steer et al. | |
| 4,072,048 A | 2/1978 | Aryan | |
| 4,739,813 A | 4/1988 | Pagani | |
| 4,768,574 A | 9/1988 | Probst | |
| 4,836,235 A | 6/1989 | Pagani | |
| 4,917,163 A * | 4/1990 | Schultz | B60C 23/003 152/415 |
| 5,035,255 A * | 7/1991 | Geiger | B60C 23/003 137/102 |
| 5,309,969 A * | 5/1994 | Mittal | B60C 23/003 137/224.5 |
| 5,816,284 A | 10/1998 | Lin | |
| 6,363,985 B1 | 4/2002 | Beesley | |
| 6,427,714 B2 * | 8/2002 | Freigang | B60C 23/003 137/225 |
| 6,439,044 B1 | 8/2002 | Tigges | |
| 6,510,882 B1 | 1/2003 | Arvidsson et al. | |
| 6,550,511 B2 | 4/2003 | Nienhaus | |
| 7,287,565 B2 | 10/2007 | Hottebart et al. | |
| 7,931,061 B2 | 4/2011 | Gonska et al. | |
| 8,783,314 B2 | 7/2014 | Tigges | |
| 8,967,182 B2 | 3/2015 | Tigges | |
| 9,352,622 B2 | 5/2016 | Tigges | |
| 2002/0023676 A1 | 2/2002 | Reinhardt | |
| 2003/0089874 A1 | 5/2003 | Hall et al. | |
| 2004/0113424 A1 | 6/2004 | Tries et al. | |
| 2005/0028865 A1 | 2/2005 | Nikolayev et al. | |
| 2005/0045259 A1 | 3/2005 | Hottebart et al. | |
| 2009/0211682 A1 | 8/2009 | Sobotzik | |
| 2009/0255598 A1 | 10/2009 | Krug, Jr. et al. | |
| 2010/0078109 A1 * | 4/2010 | Wilson | B60C 23/003 152/416 |
| 2013/0343931 A1 * | 12/2013 | Wilson | B60C 23/003 417/410.1 |
| 2015/0174972 A1 | 6/2015 | Zhou et al. | |

FOREIGN PATENT DOCUMENTS

| | | |
|---|---|---|
| DE | 202013105026 U1 | 6/2014 |
| EP | 0387495 A1 | 9/1990 |
| EP | 1095799 | 5/2001 |
| FR | 2999266 A1 * | 6/2014 |

OTHER PUBLICATIONS

Written Opinion of the International Searching Authority dated May 11, 2017 in parent application PCT/EP2016/076327.

* cited by examiner

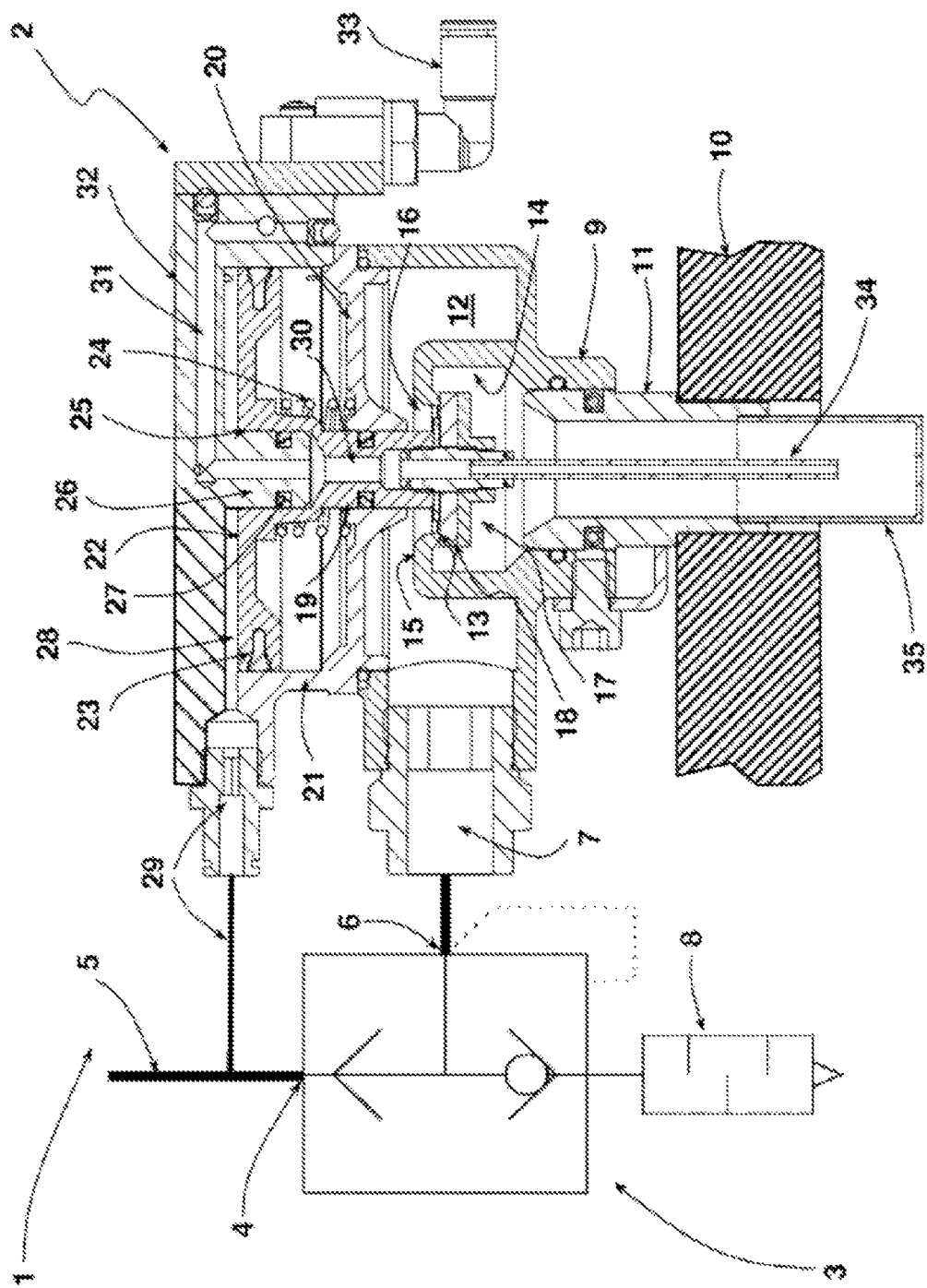

WHEEL VALVE ARRANGEMENT AND TIRE PRESSURE CONTROL SYSTEM HAVING AT LEAST ONE SUCH WHEEL VALVE ARRANGEMENT

BACKGROUND

The present disclosure relates to a wheel valve arrangement for a tire pressure control system of a vehicle comprising a pneumatically switchable wheel valve and a shuttle valve operating on the pressure balance principle as a vent valve, the control input of which is to be connected to a tire connection channel leading to a tire interior and is to be connected as a control input to an air supply line. Furthermore, the present disclosure relates to a tire pressure control system having such wheel valve arrangement associated with each wheel carrying an air-inflatable tire and connected to the tire pressure control system.

Tire pressure control systems are used in motor vehicles, such as commercial vehicles, trucks, haulers, tractors or earthmoving machines, and non-driven vehicles, such as trailers, to be able to adapt the tire pressure in the tire to different operating situations. Tire pressure adaptation is primarily dependent on the ground conditions to be traveled on. By means of tire pressure, the footprint of the tire can be changed. A tire has a larger footprint at lower tire pressures. For this reason, it is commonly believed to be preferable to drive with a lower tire pressure on soft ground opposed to, for example paved roads. It is also usually advisable to adapt the tire inflation pressure and thus the tire inflation to the respective load condition of the vehicle. Tire inflation pressure adaptation can be done while the vehicle is moving. By optimizing the tire inflation pressure, the rolling resistance and tire wear can be significantly reduced depending on the ground conditions. In addition, optimally set tire inflation pressure leads to noticeably reduced fuel consumption.

Such tire pressure control systems have a rotary feedthrough as air transfers between the vehicle-side facilities of the tire pressure control system and the associated wheel-side units. Thus, for example, to increase the tire inflation pressure, compressed air is transferred from a vehicle-side compressed air source through the rotary feedthrough to the rotatably mounted wheel. The same applies in the reverse case of a desired lowering of the tire inflation pressure, if no wheel-side tire venting is provided.

Such a rotary feedthrough comprises a vehicle-side stator and a wheel-side rotor separated by a movement gap. The stator and rotor are typically arranged coaxially to the axis of rotation of the wheel. For the compressed air transfer, the stator and rotor have annular open grooves or chambers which are opposite each other with respect to the movement gap, point towards each other, and are sealed by activatable seals (pressure seals) as described in EP 1 095 799 B 1 for the time of the compressed air transfer to form a compressed air transfer chamber. An air line is provided on the wheel side at the rotor of the rotary feedthrough leading to the wheel rim. This air line passes through the wheel rim in an opening and opens into the tire interior. A controllable valve. a wheel valve, which is opened for the process of tire pressure control and closed after completion of the process, is connected into the wheel-side air line. In a motor vehicle the compressed air itself is typically provided with a vehicle-side compressor as a compressed air source. The aforementioned compressor is commonly used in such vehicles for operating the brake system.

DE 20 2013 105 026 U1 discloses a wheel valve arrangement for a tire pressure control system according to the preamble of claim 1. This wheel valve arrangement comprises a wheel valve connected to the air supply line supplied to the wheel by the rotary feedthrough, whose outlet is connected to the inlet of a shuttle valve operating on the pressure balance principle. The shuttle valve is designed in this reference as a quick vent valve. The control side of the quick vent valve is in fluid communication with the tire interior. The wheel valve is switched via a separate compressed air pressurized control line. As a result, such a wheel valve arrangement can only be used in conjunction with a two-channel rotary feedthrough.

The foregoing examples of the related art and limitations therewith are intended to be illustrative and not exclusive. Other limitations of the related art will become apparent to those of skill in the art upon a reading of the specification and a study of the drawings.

SUMMARY

Proceeding from the foregoing, an aspect of the present disclosure is, therefore, to configure a wheel valve arrangement mentioned above in a way such that, despite the presence of a switchable wheel valve, only a single-channel rotary feedthrough is needed as part of the wheel valve arrangement for driving the wheel valve and for the desired tire pressure control and that therefore, the rotation transmission in those phases in which no compressed air is transferred, can be depressurized. The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

This is achieved by a previously-mentioned, generic wheel valve arrangement wherein the pneumatically switchable wheel valve is connected into the tire connection channel for closing and opening a fluid path between the shuttle valve and a wheel connection belonging to the wheel valve arrangement. The wheel valve has a valve body which can be moved by a piston rod which, by means of at least one spring element, acts against the valve seat assigned thereto in the closed position, can be moved by the piston rod into an open position moved away from the valve seat, and has a control piston guided in a control cylinder and connected to the piston rod. The control cylinder is to be connected or is connected by the control chamber of the control cylinder delimited by the drive side of the control piston via a control line to the supply line on the input side of the shuttle valve. Wherein, the control piston is designed in order that the valve body can be moved away from the valve seat of the valve body by means of the target tire filling pressure present in the air supply line in order to open the wheel valve.

The wheel valve arrangement comprises a switchable wheel valve and is designed in such a way that it can be switched from its closed position into its open position with the target pressure (set pressure) present in the air supply line, with which the tire carried by the wheel is to be filled. Therefore, the wheel valve already opens at the minimum air pressure provided for the tire carried by the wheel. This ensures that the wheel valve opens regardless of the range of tire inflation pressure with which the tire is to be driven. Preferably, the wheel valve already opens at a pressure slightly below the intended minimum tire filling pressure. The minimum tire filling pressure may be dictated by the use of the tire, it may also be the minimum filling pressure at which the tire can still be driven without suffering damage. In this case, it is the minimum filling pressure specified by the manufacturer.

Opening the wheel valve, in which process the valve body is moved away from its valve seat, takes place against the force of at least one return element, typically a return spring or a return spring pack, and possibly also against the higher pressure prevailing inside the tire. This is the case if tire venting is provided. Different hydraulic power reductions can be used to ensure opening movement of the wheel valve despite the possible presence of relatively low pressure in the air supply line. In one exemplary embodiment it is provided that the piston head of the control piston is relatively large compared to the diameter of the valve body. This concept makes use of the situation where a large amount of air is provided by the vehicle-side air supply for switching the wheel valve. Finally, the air supply is designed to convey 1000 or more liters in a short amount of time. In this regard, the control chamber of the control cylinder, which is connected to the air supply line, can have a relatively large cross-sectional area, without affecting the switching process.

The pressure present in the air supply line is also applied to the input side of the shuttle valve, designed as a shuttle valve operating on the pressure balance principle. This pressure is normally greater than the ambient pressure for the purposes of valve switching. If the wheel valve is opened by the pressure present in the air supply line, the control side of the shuttle valve is pressurized by the air pressure prevailing in the tire interior. If this pressure is greater than the one present in the air supply line, a venting of the tire takes place via a vent opening of the shuttle valve. The shuttle valve switches to its venting position when such pressure is applied to its inputs until the quick vent valve closes again due to a resulting pressure equilibrium. In the case of tire inflation, the pressure in the air supply line is greater than the one in the tire interior. Consequently, the quick vent valve then remains in its closed position with respect to a vent. Then the tire interior is filled through the open wheel valve. After completion of the tire filling or deflating process, the air supply line is depressurized, which closes the wheel valve. The closing of the wheel valve is supported by spring force. This ensures that even with only small tire filling pressure the wheel valve will remain securely closed. Thus, in this wheel valve arrangement, a shuttle valve operating on the pressure balance principle is used to actively switch the wheel valve without requiring additional actuators, especially those that need to be driven. The shuttle valve switches automatically in the switch position necessary to set the target pressure in the tire interior, depending on the desired target pressure and the pressure currently prevailing in the tire interior.

In an embodiment, the shuttle valve is designed as a quick vent valve. Such a quick vent valve has a sufficiently large vent cross-section, so that a tire can be deflated in a short time.

An aspect of such a wheel valve arrangement is that no additional measures must be provided to ensure operation in emergency situations, such as a line break. In the use of such a wheel valve arrangement, however, the rotary feedthrough can be configured with one channel and can be depressurized if tire inflation or tire venting is not desired. This will in turn reduce wear of the seals within the rotary feedthrough. For this reason, pneumatically activatable seals, so-called pressure seals, are used in such a rotary feedthrough. In addition, such a wheel valve arrangement can be configured with a compact design. The wheel valve connected into the tire connection channel between the shuttle valve and the tire valve, can be placed with its wheel connection directly onto a wheel valve connecting piece anchored in the wheel. Typically, the wheel valve connecting piece is such a connecting piece into which otherwise a commercially available valve is screwed. The wheel valve together with the shuttle valve designed as a quick vent valve, form a structural unit, so that only the quick vent valve is to be connected with its input side to an air supply line. In such a case, the control channel necessary for opening the wheel valve is directly connected to the input side of the quick vent valve.

In the previously disclosed embodiment, the piston head of the control piston of the wheel valve is significantly, typically several times, greater than the diameter of the valve body, to provide the required pneumatic reduction. To be able to design the control piston flat and prevent tilting in its movement within the control cylinder, an embodiment provides that the control piston and a portion of the piston rod integrally formed thereon have a cylindrical guide bushing, into which a guide pin engages which is arranged stationarily relative to the movement of the control piston. The guide of the piston rod in the region of the control piston is internal in such a configuration. In the radial circumferential direction of the control piston then only a seal with the inner wall of the control cylinder needs to be brought about, but not necessarily a guide. The control piston itself is also mounted in a cylindrical passage through which it engages the tire connection channel for the purpose of its actuation of the valve body.

When providing such an internal guide, the bottom of the guide bushing together with the end face of the guide pin can form a stop by which the maximum return position of the control piston is defined. This stop is adjusted to the seal carried by the valve body, so that the stop formed by the bottom of the guide bushing on the end face of the guide pin, if any, only comes into play when the desired seal is achieved between the valve body and the valve seat.

The provision of such an internal guide between control piston and guide pin can be used to implement a measuring pickup guided through the piston rod for a measurement of the current tire inflation pressure. In such a configuration, the piston rod is typically configured as a hollow rod. The hollow channel of the piston rod is aligned with an air channel incorporated into the guide pin, which in turn typically leads to a measuring connection, where the tire pressure can be detected. Such a configuration of the piston rod also allows a design in which to use a measuring tube protruding into the wheel valve connecting piece. A tube can be connected to the piston rod wherein the open end for the pressure detection is located inside the tire.

In addition to the aspects and embodiments described above, further aspects and embodiments will become apparent by reference to the accompanying drawings and the detailed description forming a part of this specification.

DETAILED DESCRIPTION

Before further explaining the depicted embodiment, it is to be understood that the invention is not limited in its application to the details of the particular arrangements shown, since the invention is capable of other embodiments. It is intended that the embodiment and FIGURE disclosed herein are to be considered illustrative rather than limiting. Also, the terminology used herein is for the purposes of description and not limitation.

FIG. 1 shows a schematic illustration of a wheel valve arrangement 1 of a tire pressure control system which is otherwise not shown in detail. The wheel valve arrangement 1 comprises a wheel valve 2, which is shown in section, and a quick vent valve 3, which is shown with its switch symbol. The wheel valve 2 and the quick vent valve 3 form a compact assembly. The quick vent valve 3 is a shuttle valve operating on the pressure balance principle. Its input 4 is connected to an air supply line 5. The control input 6 of the quick vent valve 3 is connected to a tire connection channel 7 of the wheel valve 2, by means of which a fluid path can be established between the control input 6 and the tire interior, to which the wheel valve arrangement 1 is connected. The quick vent valve 3 further comprises an exhaust outlet 8, from which air discharged from the tire via the tire connection channel 7 exits into the environment in the case of a desired reduction in tire pressure.

The air supply line 5 is connected in a manner not shown in detail to a single-channel rotary feedthrough with activatable pressure seals. On the vehicle side there is a compressed air supply and a control unit for the tire control, via which pressure supply the necessary compressed air for controlling the wheel valve arrangement 1 is provided. This compressed air is transferred from the vehicle-side compressed air supply to the wheel valve arrangement 1 via the abovementioned single-channel rotary feedthrough.

Wheel valve 2 comprises a wheel connection 9, configured in the illustrated exemplary embodiment as wheel valve connecting piece receptacle, with which the wheel valve arrangement is connected to wheel valve connecting piece 11 fixed in a wheel rim 10 of a wheel carrying the tire. The wheel connection 9 is placed on the free end of the wheel valve connecting piece 11 and fixed thereto.

The wheel valve 2 has the aforementioned tire connection channel 7, which connects the control input 6 of the quick vent channel 3 with the wheel connection 9 and, if connected to the wheel valve connecting piece 11 as shown in FIG. 1, with the tire interior as well. In the depicted embodiment the tire connection channel 7 is configured as an angle piece. In the area of the deflection, which is provided by an annular deflection chamber 12, there is a valve seat 13. Valve seat 13 is directed towards the wheel connection 9 and is provided by a circumferential rounded edge of a cylindrical projection 14, wherein the valve seat 13 itself is integrally formed on a radially inwardly directed circumferential ridge 15. A valve opening 16 is surrounded by the ridge 15 and the valve seat 13.

In the closed position of the wheel valve 2, a valve body 17 cooperates with the valve seat 13, whereby the valve body carries a sealing disk 18 on its side facing the valve seat 13. This sealing disk has a certain material elasticity to bring about the desired sealing effect with the wheel valve 2 closed. The valve seat 13 can be pressed slightly into the sealing surface of the sealing disk 18. The valve body 17 is carried by a piston rod 19. The piston rod 19 passes through the deflection chamber 20 opposite the ring cylinder 14 carrying the valve seat 13 with respect to the wheel connection 9 in a sealed manner. Outside the deflection chamber 12, the piston rod 19 engages in a control cylinder 21. The piston rod 19 carries a control piston 22 at its end opposite the valve body 17, which control piston is supported in the radial direction on the outside by means of a circumferential piston seal 23 on the inner wall of the control cylinder.

FIG. 1 shows the wheel valve 2 in its closed position, in which the valve body 17 rests against the valve seat 13. To ensure a secure valve closure a helical compression spring 24 is used, by means of which the sealing side of the sealing disk 18 of the valve body 17 is biased against the valve seat 13. The helical compression spring 24 is supported on the side of the deflection chamber wall 20 facing away from the deflection chamber 12 and on the side of the control piston 22 facing the wall 20 as well.

A cylindrical guide bushing 25 incorporated into the back side is used for further guidance of the piston rod 19 into which guide bushing a guide pin 26 engages—in addition to its guidance in the passage through the deflection chamber wall 20—which is stationary relative to the movement of the piston rod 19. The guide pin 26 carries a sealing ring 27, an O-ring, on the outside designed for sealing.

The control cylinder 21 is divided into two chambers by the control piston 22, wherein one of the two chambers, namely the one which is located on the side opposite the helical compression spring 24, forms a control chamber 28. For this purpose, a control line 29 is connected to the control chamber, which in turn is connected to the air supply line 5. Since the control chamber 28 is pressurized with a certain air pressure, the control piston 22 and thus the piston rod 19 with the valve body 17 seated thereon are moved longitudinally axially, whereby the valve body 17 is lifted from the valve seat 13, and the wheel valve 2 is opened. The connection of the control chamber 28 to the air supply line 5 is shown merely schematically in the illustrated embodiment. Preferred is a configuration in which the control line 29 is connected directly to a connection fitting of the quick vent valve 3, so that when mounting the wheel valve arrangement 1 only the air supply line 5 must be connected to the input of the quick vent valve 3.

As seen in FIG. 1, the diameter of the control piston 22 is several times greater than the diameter of the valve body 17. In the illustrated embodiment, the diameter of the control piston 22 is about 2.5 times as large as the diameter of the valve body 17. The area of the piston head of the control piston 22 relevant for an operation of the wheel valve is thus multiple times greater than the one of the valve body 17. This reduction is required so that the control piston 22 can be moved even at low pressure in the air supply line 5—the target pressure of the tire pressure control—in order to move the valve body 17 away from the valve seat 13 in order to open the wheel valve 2. In this respect, the effective surface of the piston head of the control piston 22 is adapted to the opposing forces that must be overcome in order to allow for the desired movement at the respectively required minimum tire filling pressure in the air supply line 5. The back pressure acting on the control piston 22 is provided by the helical compression spring 24 and, in the event that a reduction in tire pressure is provided, the tire inflation pressure present in the tire valve 11 and acting on the back of the valve body 17. In the illustrated embodiment, the components impacting a control piston control—helical compression spring 24, size of the valve body 17 and size of the valve opening 16, respectively—are in this regard coordinated accordingly. This is especially possible in vehicles using such wheel valve arrangements, even without having to design an excessively large diameter of the control piston, since tires of agricultural vehicles, such as tractors or their trailers are driven with a maximum tire filling pressure of 2 or 2.5 bar and a minimum tire filling pressure of 0.5 bar. As a result, the pressure differential against which the valve body 17 must be moved in case of a maximum filled tire when a pressure reduction is intended, is not excessively high.

Thus, in the described concept of the wheel valve arrangement a pneumatic reduction is used skillfully to provide a switchable wheel valve in connection with a tire pressure control system on the wheel side despite a one-channel rotary feedthrough in order to be able to switch the wheel valve arrangement just like in a conventional two-channel wheel valve arrangement. For this reason, when not using the tire control, the rotary feedthrough can be depressurized with respect to the pressure seals.

In the illustrated embodiment, the piston rod 19 is configured as a hollow rod. The inner channel 30 of the piston rod 19 is in fluid communication with an air channel 31, incorporated into the lid 32 of the control cylinder 21. The air channel 31 continues into the guide pin 26 and opens at its end face and is therefore in fluid communication with channel 30 of the piston rod 19. The other end of the air channel 31 runs to a measuring connection 33, to which a pressure gauge can be connected. During operation of the wheel valve arrangement 1, when it is connected to a wheel, a battery-operated pressure measuring sensor is located at the measuring connection 33, which pressure measuring sensor wirelessly transmits its measured values to the vehicle-side control device for controlling the tire pressure control system. In this configuration, the pressure measuring sensor is located outside of the metal housing of the wheel valve 2.

A measuring tube 34, which may well be configured as a measuring tube, is inserted in the free end of the piston rod 19. This measuring tube extends into the wheel valve connecting piece 11 and ends therein in the illustrated embodiment. When the actuating piston 19 is moved the measuring tube 34 is moved as well.

The tire inflation pressure can also be measured as static air pressure during the process of tire filling or tire deflating via the measuring line provided by measuring tube 34, channel 30, and air channel 31 up to the measuring connection 33. Interestingly, it has been shown that detection of the static air pressure is also possible when the tire-side mouth of the measuring tube 34 is located within the wheel valve connecting piece 11, although at this point particularly high flow velocities prevail in the event of tire pressure control. The detection of air pressure or changing air pressure in tire inflation or deflation allows for control of the filling or deflating process by means of such a pressure measuring sensor. This allows for an exact determination of the current tire inflation pressure and particularly rapid tire pressure control. In many tire pressure control systems, proportional valves serve the purpose of adjusting the desired tire inflation pressure. However, such valves are disadvantageous in that when decreasing pressure differentials between the target pressure (set pressure) and the actual pressure, the pressure compensation rate will decrease as well. Therefore, for some applications, this type of pressure control is considered too slow. If, on the other hand, the pressure is detected by means of a pressure measuring probe connected to a measuring connection 33, the tire inflating or deflating process can be terminated exactly when the desired tire inflation pressure has been set. The inflating or deflating process runs over the entire time of tire inflation or tire deflation at maximum speed.

A filter basket 35 projecting into the tire interior is connected to the wheel valve connecting piece 11. In the illustrated embodiment, the filter basket 35 is configured as a screen basket and serves to prevent rubber particles detached from the inner wall of the tire from penetrating into the wheel valve 2 and into the measuring tube 34 with its relatively small diameter as well. By means of the filter basket 35, rubber particles detaching in a driving operation of the tire are effectively prevented from penetrating into the wheel valve connecting piece 11, so that the tightness of the wheel valve 2 and the patency of the measuring channel is not affected by contamination.

An advantage of the above-described detection of the tire inflation pressure with the measuring channel passing through the wheel valve is that only a single passage in the rim of the wheel is required for these purposes.

The present disclosure was described based on exemplary embodiments. A person skilled in the art will derive numerous embodiments for implementing the present disclosure without departing from the scope of the present claims. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this present disclosure as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the present disclosure.

LIST OF REFERENCE NUMERALS

1 Wheel valve arrangement
2 Wheel valve
3 Quick vent valve
4 input
5 Air supply line
6 Control input
7 Tire connection channel
8 Exhaust outlet
9 Wheel connection
10 Wheel rim
11 Wheel valve connecting piece
12 Deflection chamber
13 Valve seat
14 Projection
15 Ridge
16 Valve opening
17 Valve body
18 Sealing disk
19 Piston rod
20 Deflection chamber wall 21 Control cylinder
22 Control piston
23 Piston seal
24 Helical compression spring
25 Guide bushing
26 Guide pin
27 Seal
28 Control chamber
29 Control line
30 Channel
31 Air channel
32 Lid
33 Measuring connection
34 Measuring tube
35 Filter basket

The invention claimed is:

1. A wheel valve arrangement for a tire pressure control system of a vehicle, wherein said wheel valve arrangement comprises:
   a pneumatically switchable wheel valve and a shuttle valve operating on a pressure balance principle as a vent valve, wherein a control input of the shuttle valve is to be connected to a tire connection channel leading to a tire interior, and an input of the shuttle valve is to be connected to an air supply line,
   wherein said pneumatically switchable wheel valve is connected into the tire connection channel for closing and opening a fluid path between the shuttle valve and a wheel connection of the wheel valve arrangement, said wheel valve having a valve body which can be moved by a piston rod, by means of at least one spring element, into a closed position where the valve body acts against a valve seat assigned thereto, and can be moved by the piston rod into an open position moved away from the valve seat, and said wheel valve having a control piston guided in a control cylinder and connected to the piston rod, said control cylinder is to be connected or is connected by a control chamber of the control cylinder delimited by a drive side of the control piston via a control line to the air supply line on an input side of the shuttle valve,
   wherein the control piston is designed in order that the valve body can be moved away from the valve seat by means of a target tire filling pressure present in the air supply line to open the wheel valve,
   wherein the piston rod in a portion carrying the control piston has a centric guide bushing into which a guide pin, which is stationary relative to the movement of the piston rod, engages for bearing the piston rod.

2. The wheel valve arrangement of claim 1, wherein the control line is connected to an input-side connection fitting of the shuttle valve, wherein said connection fitting of the shuttle valve is connected to the air supply line.

3. The wheel valve arrangement of claim 2, wherein the shuttle valve is configured as a quick vent valve.

4. The wheel valve arrangement of claim 2, wherein the diameter of a piston head of the control piston has such a piston area, so that the valve body can be moved away from the valve seat by means of the target tire filling pressure present in the air supply line in order to open the wheel valve.

5. The wheel valve arrangement of claim 2, wherein the control piston is designed to move the valve body away from the valve seat by means of the piston rod when the pressure present in the air supply line corresponds to or is lower than an intended minimum internal tire pressure.

6. The wheel valve arrangement of claim 2, wherein a bottom of the centric guide bushing is configured as a stop with an end face of the guide pin.

7. The wheel valve arrangement of claim 2, wherein the valve body is rigidly connected to the piston rod.

8. The wheel valve arrangement of claim 2, wherein the valve body of the wheel valve is located in an angle piece of the tire connection channel,
   wherein the valve seat is an annular valve seat facing the wheel connection is-provided within the angle piece, through which the piston rod passes, and the valve body can be moved away from the valve seat by a movement of the control piston towards the wheel connection.

9. The wheel valve arrangement of claim 2, wherein the piston rod is configured as a hollow rod with a channel, and the guide pin has an air channel in fluid communication with the channel of the piston rod that is connected to a measuring connection.

10. The wheel valve arrangement of claim 1, wherein the shuttle valve is configured as a quick vent valve.

11. The wheel valve arrangement of claim 1, wherein the diameter of a piston head of the control piston has such a piston area, so that the valve body can be moved away from the valve seat by means of the target tire filling pressure present in the air supply line in order to open the wheel valve.

12. The wheel valve arrangement of claim 1, wherein the control piston is designed to move the valve body away from the valve seat by means of the piston rod when the pressure present in the air supply line corresponds to or is lower than an intended minimum internal tire pressure.

13. The wheel valve arrangement of claim 12, wherein the area of a piston head of the control piston corresponds to a multiple of the area of the valve body.

14. The wheel valve arrangement of claim 1, wherein a bottom of the centric guide bushing is configured as a stop with an end face of the guide pin.

15. The wheel valve arrangement of claim 1, wherein the valve body is rigidly connected to the piston rod.

16. The wheel valve arrangement of claim 1, wherein the valve body of the wheel valve is located in an angle piece of the tire connection channel,
   wherein the valve seat is an annular valve seat facing the wheel connection is-provided within the angle piece, through which the piston rod passes, and the valve body can be moved away from the valve seat by a movement of the control piston towards the wheel connection.

17. The wheel valve arrangement of claim 1, wherein the piston rod is configured as a hollow rod with a channel, and the guide pin has an air channel in fluid communication with the channel of the piston rod that is connected to a measuring connection.

18. A tire pressure control system for a vehicle having a compressed air source arranged on a vehicle side of the tire pressure control system, with a rotary feedthrough associated with each wheel connected to the tire pressure control system for transmitting compressed air to the wheel carrying a tire, with a control device for controlling the process of raising and/or lowering a tire inflation pressure of the tires of each wheel connected to the tire pressure control system and with the wheel valve arrangement of claim 1 associated with each wheel connected to the tire pressure control system.

* * * * *